(12) United States Patent
Oota et al.

(10) Patent No.: US 12,327,660 B2
(45) Date of Patent: Jun. 10, 2025

(54) GROMMET

(71) Applicant: SUMITOMO WIRING SYSTEMS, LTD., Mie (JP)

(72) Inventors: Ryo Oota, Kanagawa (JP); Takashi Suzuki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 396 days.

(21) Appl. No.: 17/801,001

(22) PCT Filed: Feb. 16, 2021

(86) PCT No.: PCT/JP2021/005704
§ 371 (c)(1),
(2) Date: Aug. 19, 2022

(87) PCT Pub. No.: WO2021/172097
PCT Pub. Date: Sep. 2, 2021

(65) Prior Publication Data
US 2023/0093525 A1   Mar. 23, 2023

(30) Foreign Application Priority Data
Feb. 27, 2020 (JP) ................. 2020-031220

(51) Int. Cl.
*H01B 17/58* (2006.01)
*B60R 16/02* (2006.01)
(Continued)

(52) U.S. Cl.
CPC ....... *H01B 17/583* (2013.01); *B60R 16/0222* (2013.01); *H02G 3/22* (2013.01); *H02G 15/013* (2013.01)

(58) Field of Classification Search
CPC ...... H01B 17/58; H01B 17/583; B60R 16/02; B60R 16/0222; H02G 3/22; H02G 3/24;
(Continued)

(56) References Cited

U.S. PATENT DOCUMENTS 6,660,937 B1    12/2003   MacLeod et al.
2009/0065235 A1*  3/2009  Uchibori ............. B60R 16/0222
                                                                    174/152 G
(Continued)

FOREIGN PATENT DOCUMENTS

JP     H03-078655 U    8/1991
JP     2004-274886 A   9/2004
JP     2017-158355 A   9/2017

OTHER PUBLICATIONS

International Search Report issued on Apr. 13, 2021 for WO 2021/172097 A1 (4 pages).

*Primary Examiner* — Roshn K Varghese
(74) *Attorney, Agent, or Firm* — Venjuris, P.C.

(57) ABSTRACT

In the grommet, it is assumed that a point at a leading end position of the extension portion is a point A, and a point at a position furthest from the point A as seen in the insertion direction in a leading end region of the fitting portion in the insertion direction is a point B. It is assumed that a width of the through hole in a cross section that is parallel with the insertion direction and passes through the point A and the point B when the fitting portion is fitted to the through hole is a hole width W. At this time, a total of a linear distance L between the point A and the point B and a thickness T of the seal lip is larger than the hole width W.

7 Claims, 7 Drawing Sheets

(51) Int. Cl.
*H02G 3/22* (2006.01)
*H02G 15/013* (2006.01)

(58) Field of Classification Search
CPC .......... H02G 3/26; H02G 3/30; H02G 15/013; F16J 15/02; F16J 15/10
See application file for complete search history.

(56) References Cited

U.S. PATENT DOCUMENTS

2015/0288158 A1    10/2015  Suzuki
2017/0246999 A1*    8/2017  Nakagawa ............... F16L 11/11

* cited by examiner

GROMMET

CROSS REFERENCE TO RELATED APPLICATIONS

This application is a national phase of PCT application No. PCT/JP2021/005704, filed on 16 Feb. 2021, which claims priority from Japanese patent application No. 2020-031220, filed on 27 Feb. 2020, all of which are incorporated herein by reference.

TECHNICAL FIELD

The present disclosure relates to a grommet.

BACKGROUND

Patent Document 1 discloses a grommet to be attached to a through hole with burring that is formed in a vehicle body panel.

PRIOR ART DOCUMENT

Patent Document

Patent Document 1: JP 2015-198528 A

SUMMARY OF THE INVENTION

Problems to be Solved

When a grommet is inserted in and mounted to a through hole in an inclined orientation, a seal lip may be sandwiched between a portion of the grommet other than the seal lip and an inner circumferential edge of the through hole, for example. As a result of this, the original sealability of the grommet may be impaired. On the other hand, for example, it is not easy to insert and mount the grommet in a proper orientation to a through hole located at a position that is hard for an operator to see, and the workability is not always good.

An object of the present disclosure is to improve the workability of mounting of a grommet.

Means to Solve the Problem

A grommet according to an aspect of the present disclosure includes a fitting portion to be inserted and fitted to a through hole in an insertion direction, an extension portion extending forward in the insertion direction from the fitting portion, a seal lip provided on a circumference of the fitting portion, and to seal an outer circumference of the fitting portion that is fitted to the through hole by abutting a circumferential edge portion of the through hole. In this grommet, it is assumed that a point at a leading end position of the extension portion in the insertion direction is a point A, and a point at a position furthest from the point A as seen in the insertion direction in the leading end region of the fitting portion in the insertion direction is a point B. Also, it is assumed a width of the through hole in a cross section that is parallel with the insertion direction and passes through the point A and the point B when the fitting portion is fitted to the through hole is a hole width W. A total of a linear distance L between the point A and the point B and a thickness T of the seal lip is larger than the hole width W.

Effect of the Invention

According to the grommet, the workability of mounting of a grommet can be improved.

DETAILED DESCRIPTION TO EXECUTE THE INVENTION

Hereinafter, a grommet according to an embodiment will be described with reference to the drawings. In the following descriptions, the constituent elements having the same functions will be given the same reference numerals, and the redundant descriptions will be omitted.

Figure 1:
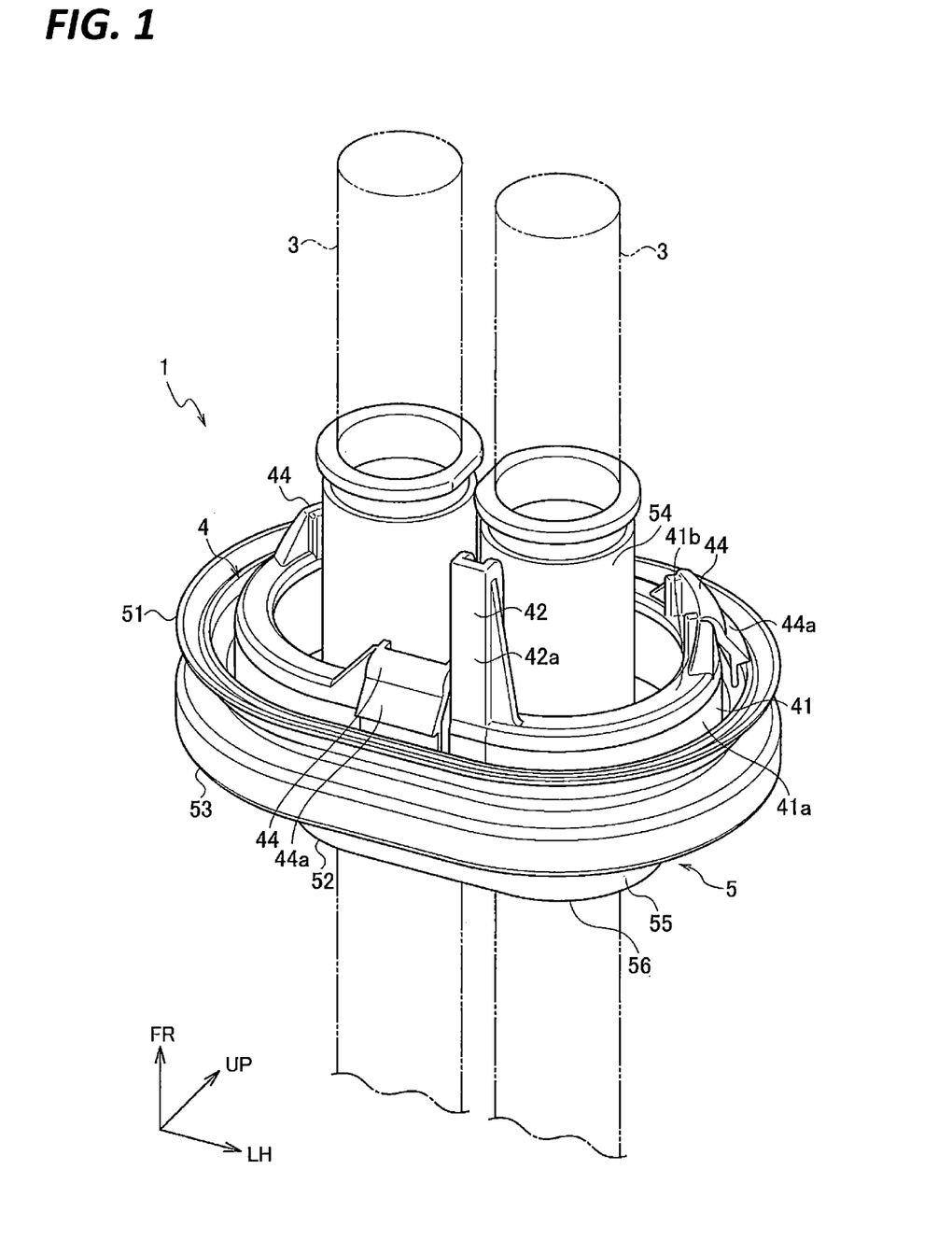
FIG. 1 is front perspective view of a grommet.
Figure 2:
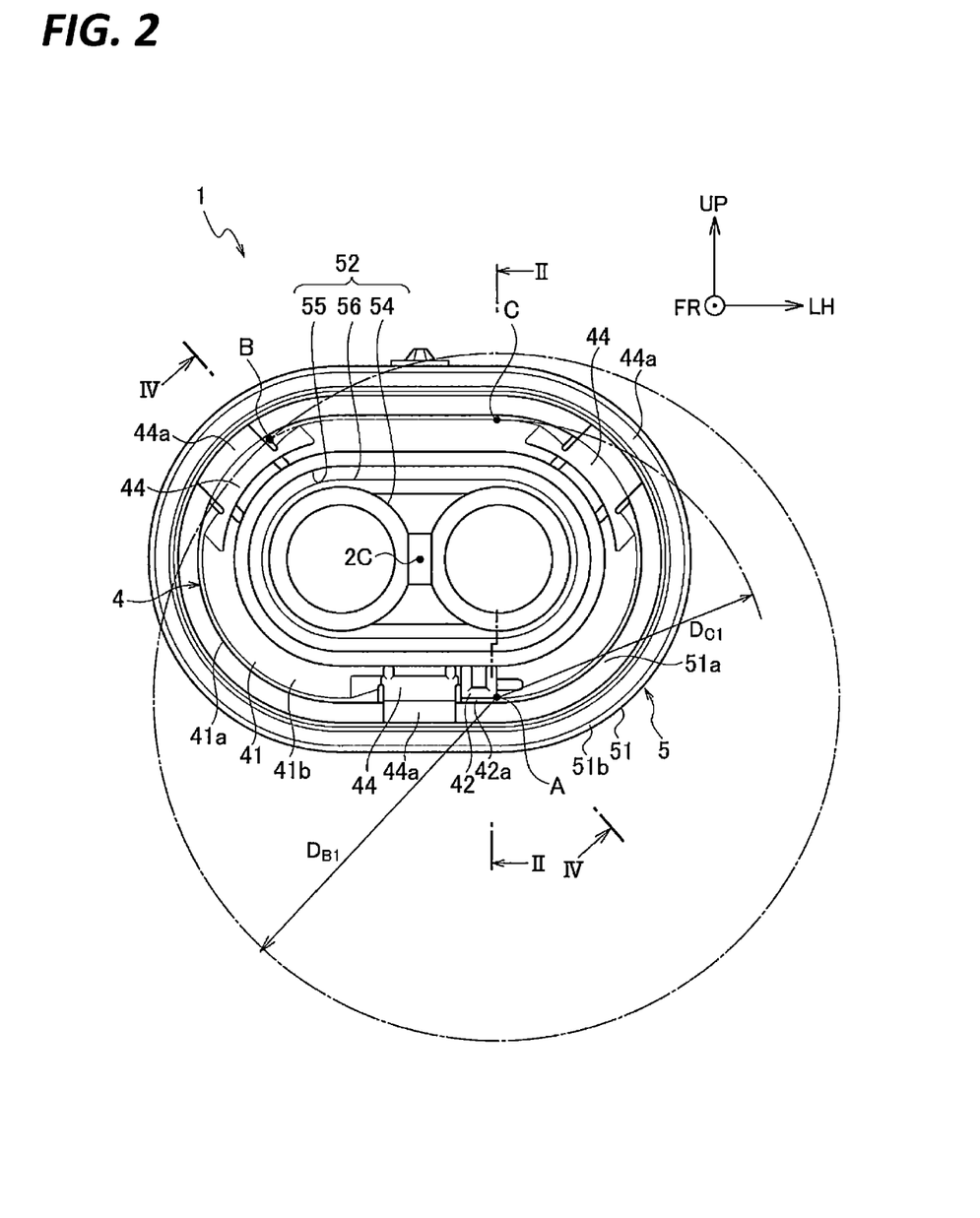
FIG. 2 is a front view of the grommet.
Figure 3:
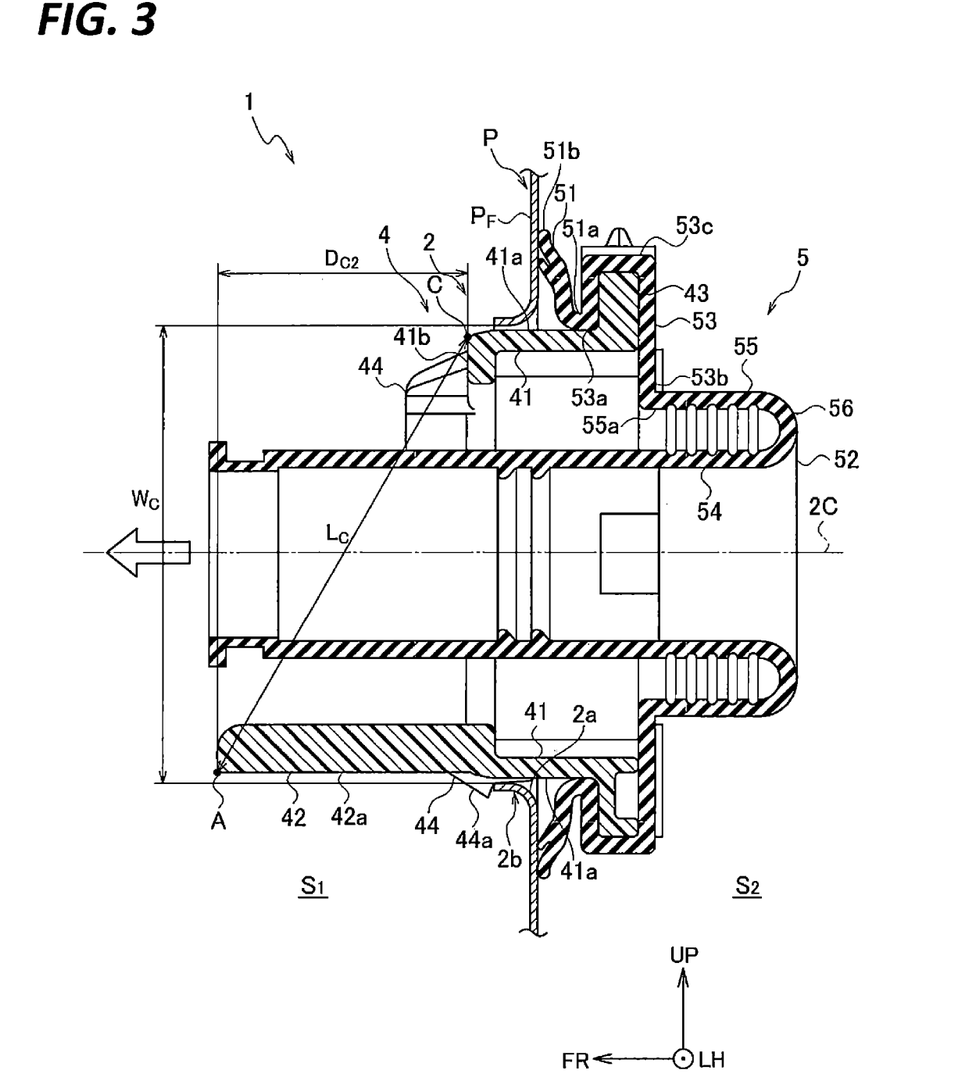
FIG. 3 is a cross-sectional view showing the grommet in a state where the grommet has been mounted to a through hole in a proper orientation, taken along line II-II in FIG. 2.

As shown in FIGS. 1 to 3, a grommet 1 is attached to a lateral through hole 2 formed in a flat surface portion $P_F$ of a panel member P, for example. The panel member P is a vehicle body panel that partitions between a space $S_1$ inside a vehicle cabin and a space $S_2$ outside the vehicle cabin, for example. A burring 2b is formed at an inner circumferential edge 2a (hereinafter, hole inner circumferential edge 2a) of the through hole 2, and the grommet 1 is inserted into the through hole 2 from a side on which the burring 2b does not protrude (in the present embodiment, the space $S_2$ outside the vehicle cabin). Protection tubes 3 made of metal such as stainless steel or aluminum shown by the two-dot chain lines in FIG. 1, and wires (not shown) such as power cables, wire harnesses, and the like that are inserted into the protection tubes 3, are inserted into the grommet 1. These protection tubes 3 and the wires pass through the panel member P, and are connected to a battery (not shown) installed in the space S inside the vehicle cabin and an electrical device (not shown) such as an inverter mounted in the space $S_2$ outside the vehicle cabin, for example.

For illustrative reasons, in the present specification, a direction in which the grommet 1 moves with respect to the through hole 2 when the grommet 1 is inserted into the through hole 2 in the proper orientation is defined as an "insertion direction" of the grommet 1, and a direction orthogonal to the insertion direction is defined as an "insertion orthogonal direction" of the grommet 1. In the present embodiment, the insertion direction is parallel with an axis 2c of the through hole 2 in a state where the grommet 1 has been attached to the through hole 2 in the proper orientation. The axis 2c of the through hole 2 is a straight line that passes through the center (figure center) of the opening of the through hole 2 and is parallel with the normal of the circumferential edge portion (i.e., flat surface portion $P_F$) of the through hole 2 of the panel member P. In the insertion orthogonal direction, the direction approaching the axis 2c of the through hole 2 is inward, and the direction moving away from the axis 2c of the through hole 2 is outward.

As shown in FIGS. 1 to 3, the grommet 1 is provided with an inner member 4 and a grommet main body 5 attached to the inner member 4. In the drawings, the FR indicates forward in an insertion direction, the LH indicates leftward with respect to the horizontal direction orthogonal to the insertion direction, and the UP indicates upward with respect to a direction orthogonal to the FR and the LH.

The inner member 4 is made of a resin, for example, and provided with a fitting portion 41 that is inserted and fitted to the through hole 2 in the insertion direction, and an extension portion 42 that extends forward in the insertion direction from the fitting portion 41. As shown in the drawings, the inner member 4 may be provided with a flange portion 43 and a locking piece 44.

The fitting portion 41 has a hollow tubular shape or annular shape. The fitting portion 41 has an oval shape as viewed in the insertion direction. The outer circumferential surface 41a of the fitting portion 41 has an oblong-like cross section orthogonal to the insertion direction. The shape and outer dimension of the outer circumferential surface 41a of the fitting portion 41 are defined such that a slight gap allowing movement of the fitting portion 41 inside the through hole 2 is provided between the outer circumferential surface 41a and the hole inner circumferential edge 2a. In the present embodiment, the through hole 2 has an oblong shape that is elongated in the horizontal direction.

A leading end region 41b of the fitting portion 41 in the insertion direction includes a leading edge located on the same plane. As shown in FIG. 3, when the grommet 1 is attached to the through hole 2 in the proper orientation, the entire circumference of the fitting portion 41 is inserted into the through hole 2 at a uniform depth.

The extension portion 42 extends forward in the insertion direction from the leading end region 41b in the insertion direction of the fitting portion 41. The entirety of the extension portion 42 linearly extends substantially in parallel with the insertion direction. The extension portion 42 has a rectangular cross section that is open inward in the insertion orthogonal direction. The extension portion 42 has a flat side surface 42a on an outward part in the insertion orthogonal direction that extends substantially in parallel with the insertion direction. The side surface 42a is smoothly continuous with an outer circumferential surface 41a of the fitting portion 41 located rearward in the insertion direction of the side surface 42a. In the example shown in the drawings, the extension portion 42 extends from a portion that abuts a linear portion of the hole inner circumferential edge 2a on the lower side in the leading edge region 41b of the fitting portion 41. The shape of the cross section of the extension portion 42 is not particularly limited, and may be an L shape or the like.

Also, when at least a portion of the inner tube portion 54 (described later) of the grommet main body 5 is located inside the through hole 2 (see FIGS. 3 and 7), the extension portion 42 extends interposed between the inner tube portion 54 and the hole inner circumferential edge 2a on the lower side of the inner tube portion 54. Specifically, the extension portion 42 is provided spaced apart from a lower side surface of the inner tube portion 54 below the lower side surface. The extension portion 42 extends substantially in parallel with the inner tube portion 54 to substantially the same position in the insertion direction as the leading end in the insertion direction of the inner tube portion 54.

The flange portion 43 continuously extends in the circumferential direction along the end edge rearward in the insertion direction of the fitting portion 41. The flange portion 43 protrudes from the outer circumferential surface 41a of the fitting portion 41 outward in the insertion orthogonal direction. Accordingly, the outer dimension, that is the dimension in the insertion orthogonal direction of the flange portion 43 is larger than the outer dimension of the outer circumferential surface 41a of the fitting portion 41.

The locking pieces 44 are provided at three locations substantially equally spaced apart from each other in the circumferential direction in the leading end region 41b of the fitting portion 41. The locking pieces 44 protrude from the leading end region 41b forward in the insertion direction. When the grommet 1 is pushed into the through hole 2, the locking pieces 44 is elastically deformed inward in the insertion orthogonal direction due to the pressing force of the hole inner circumferential edge 2a that acts inward in the insertion orthogonal direction on the side surface 44a on the outer side in the insertion orthogonal direction Also, the locking pieces 44 elastically return when the grommet 1 is pushed to a locking position (position in FIG. 3) in the proper orientation, and lock onto the end edge of the burring 2b of the through hole 2. The locking pieces 44 in the present embodiment are provided at three locations in the leading end region 41b, but the number of the locking pieces 44 is not limited to this, and the locking pieces 44 may also be provided at two or four or more locations.

The grommet main body 5 is made of an elastic resin material such as rubber or elastomer, and integrally provided with an annular seal lip 51 provided continuously at the outer circumferential edge portion as seen in the insertion direction, double cylindrical portions 52 provided in the center portion, and a connection portion 53 that connects continuously between the seal lip 51 and the double cylindrical portions 52.

The seal lip 51 is provided on the circumference of the fitting portion 41 and has a conical shape that expands forward in the insertion direction. A base end edge portion 51a of the seal lip 51 is connected to a front end edge 53a of the connection portion 53 in the insertion direction, in front of the flange portion 43 in the insertion direction. The leading edge portion 51b of the seal lip 51 extends forward in the insertion direction and outward in the insertion orthogonal direction, and as shown in FIG. 3, when the grommet 1 is attached to the through hole 2 in the proper orientation, the entire circumference of the grommet 1 is pressed against the circumferential edge portion of the through hole 2. In this manner, the seal lip 51 can seal the outer circumference of the fitting portion 41 that is fitted to the through hole 2.

The double cylindrical portions 52 are each provided with an inner tube portion 54 that is insertion portion, an outer tube portion 55, and a folded back portion 56 that has a U-shaped cross section and continuously connects the rear end edges of the inner tube portion 54 and the outer tube portion 55 in the insertion direction to each other. The front end edge 55a of the outer tube portion 55 in the insertion direction is connected to the rear end edge 53b of the connecting portion 53 in the insertion direction. In the present embodiment, the one grommet main body 5 is provided with two double cylindrical portions 52, but the number of the double cylindrical portions 52 is not limited to this, and one or three or more double cylindrical portions 52 may also be provided to the one grommet main body 5.

The connection portion 53 is engaged with the flange portion 43 of the inner member 4 at the outer circumferential edge portion 53c outward of the connection portion 53 in the insertion orthogonal direction. In this manner, the connection portion 53 positions and supports the seal lip 51 and the double cylindrical portions 52 with respect to the inner member 4. The outer circumferential edge portion 53c of the connection portion 53 has a rectangular cross section that is open inward in the insertion orthogonal direction, and surrounds the flange portion 43 of the inner member 4 from outside in the insertion orthogonal direction.

The protection tube 3 and the wire that are elongated members are inserted into respective inner tube portions 54. An outer circumferential surface 41a of each protection tube 3 is in surface contact with the inner circumferential surface of the inner tube portion 54. Each protection tube 3 protects at least a portion of the wire that is routed inside the space $S_2$ outside the vehicle cabin. In the present embodiment, when the grommet 1 is attached to the through hole 2, the protection tubes 3 and the wires are first inserted and fixed in the inner tube portions 54, and the grommet 1 in the state where the protection tubes 3 and the wires have been inserted thereto is inserted into the through hole 2.

Figure 4:
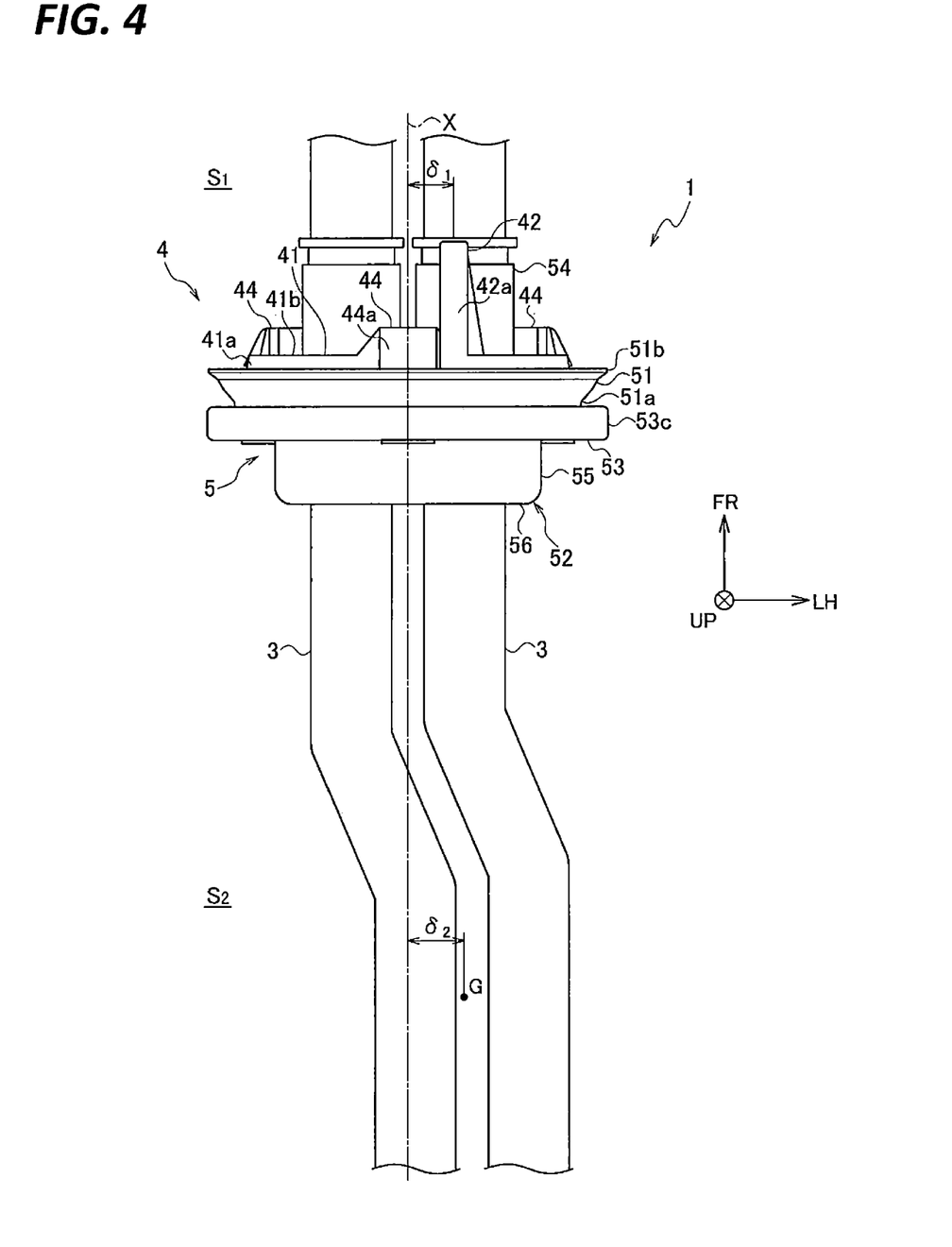
FIG. 4 is a diagram showing a lower side of the grommet in a state where a protection tube and a wire have been inserted.

As shown in FIG. 4, the protection tubes 3 and the wires bend and extend in the horizontal direction in the space $S_2$ outside of the vehicle cabin, and the gravity centers G thereof are eccentrically located with respect to the center line X of the grommet 1 that extends in the horizontal direction orthogonal to the insertion direction. The extension portion 42 of the inner member 4 is located on the side on which the gravity centers G of the protection tubes 3 and the wires are located relative to the center line X.

Figure 5:
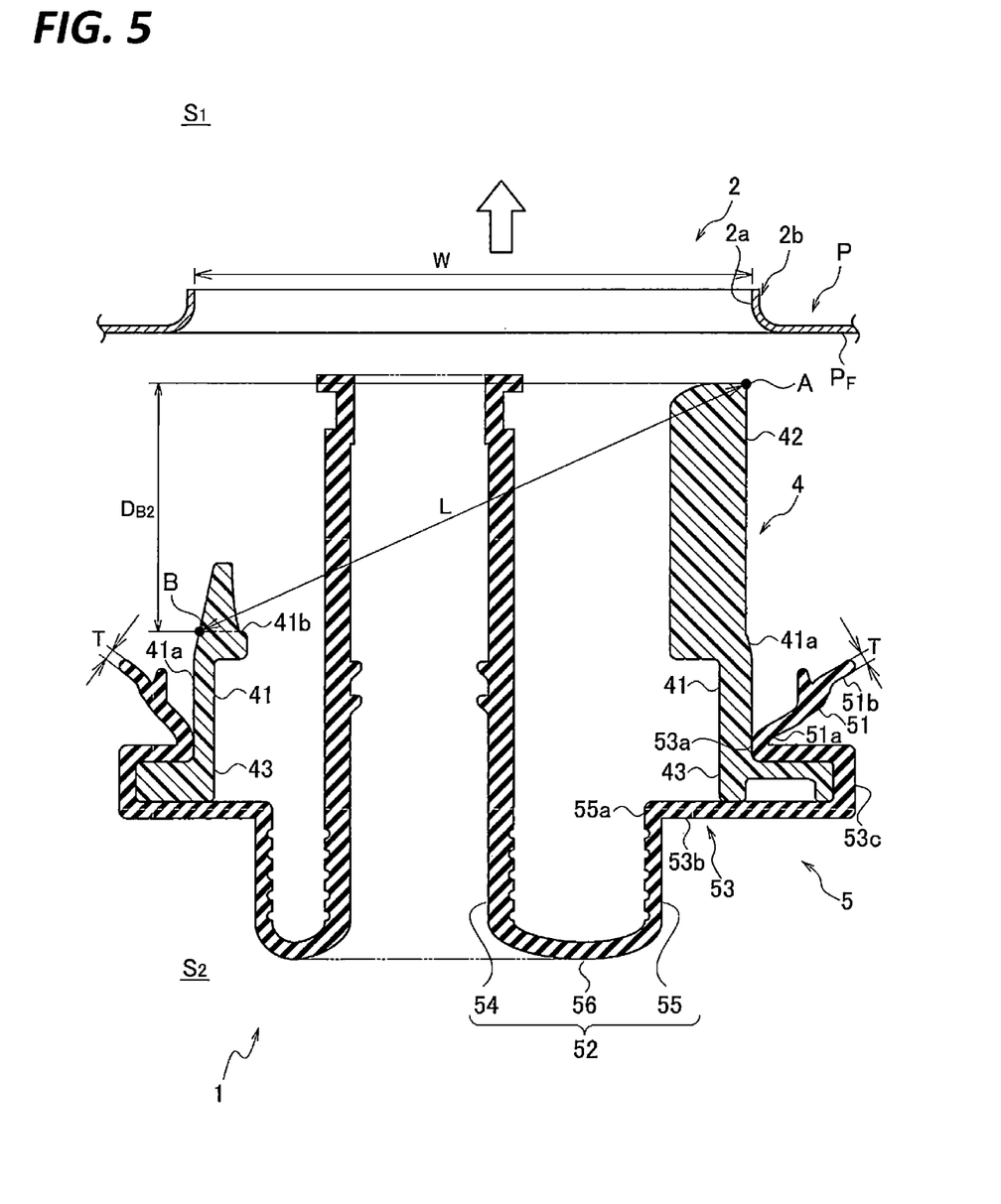
FIG. 5 is a cross-sectional view taken along line IV-IV in FIG. 2.

In the present embodiment, as shown in FIG. 5, the total of the linear distance between a point A and a point B and a thickness T of the seal lip 51 is larger than a hole width W (L+T>W). Here, the point A is a point at the leading end of the extension portion 42 in the insertion direction, and as shown in FIG. 2, the point B is a point at a position that is farthest from the point A in the leading end region 41b of the fitting portion 41 in the insertion direction, as seen in the insertion direction. Also, as shown in FIG. 5, the hole width W is the width of the through hole 2 in the cross-section that is parallel with the insertion direction, and that passes through the point A and point B when the fitting portion 41 is fitted to the through hole 2.

Note that a point C shown in FIGS. 2 and 3 is a point in the leading end region 41b and a point located in the position that opposes a position above the point A as seen in the insertion direction. As shown in FIG. 2, a distance $D_{C1}$ between the point A and the point C in the direction orthogonal to the insertion direction is smaller than a distance $D_{B1}$ between the point A and the point B in the direction orthogonal to the insertion direction. On the other hand, a distance $D_{C2}$ (see FIG. 3) between the point A and the point C in the insertion direction is equal to a distance $D_{B2}$ between the point A and the point B (see FIG. 5). Accordingly, the ratio ($D_{C2}/D_{C1}$) of the distance $D_{C2}$ between the point A and the point B to the distance $D_{C1}$ between the point A and the point C is always larger than the ratio of the distance $D_{B2}$ ($D_{C2}/D_{B1}$). For this reason, as long as the total of the linear distance L and the thickness T of the seal lip 51 is larger than the hole width W (L+T>W), the total of the linear distance $L_C$ (see FIG. 3) between the points A and C and the thickness T of the seal lip 51 will not be smaller than a hole width $W_C$ (see FIG. 3). The hole width $W_C$ is the width of the through hole 2 on the cross section that is parallel with the insertion direction and passes through the point A and the point C (in the present embodiment, the hole width $W_C$ corresponds to the width in the up-down direction of the through hole 2). The relationship between the dimensions mentioned herein, that is, the relationship between the linear distance from the point A to any point in the leading region 41b other than the point C, the thickness T of the seal lip, and the corresponding hole width also holds true for any point in the leading region 41b other than the point C.

Hereinafter, the operations and effects of the present embodiment will be described.

Figure 6:
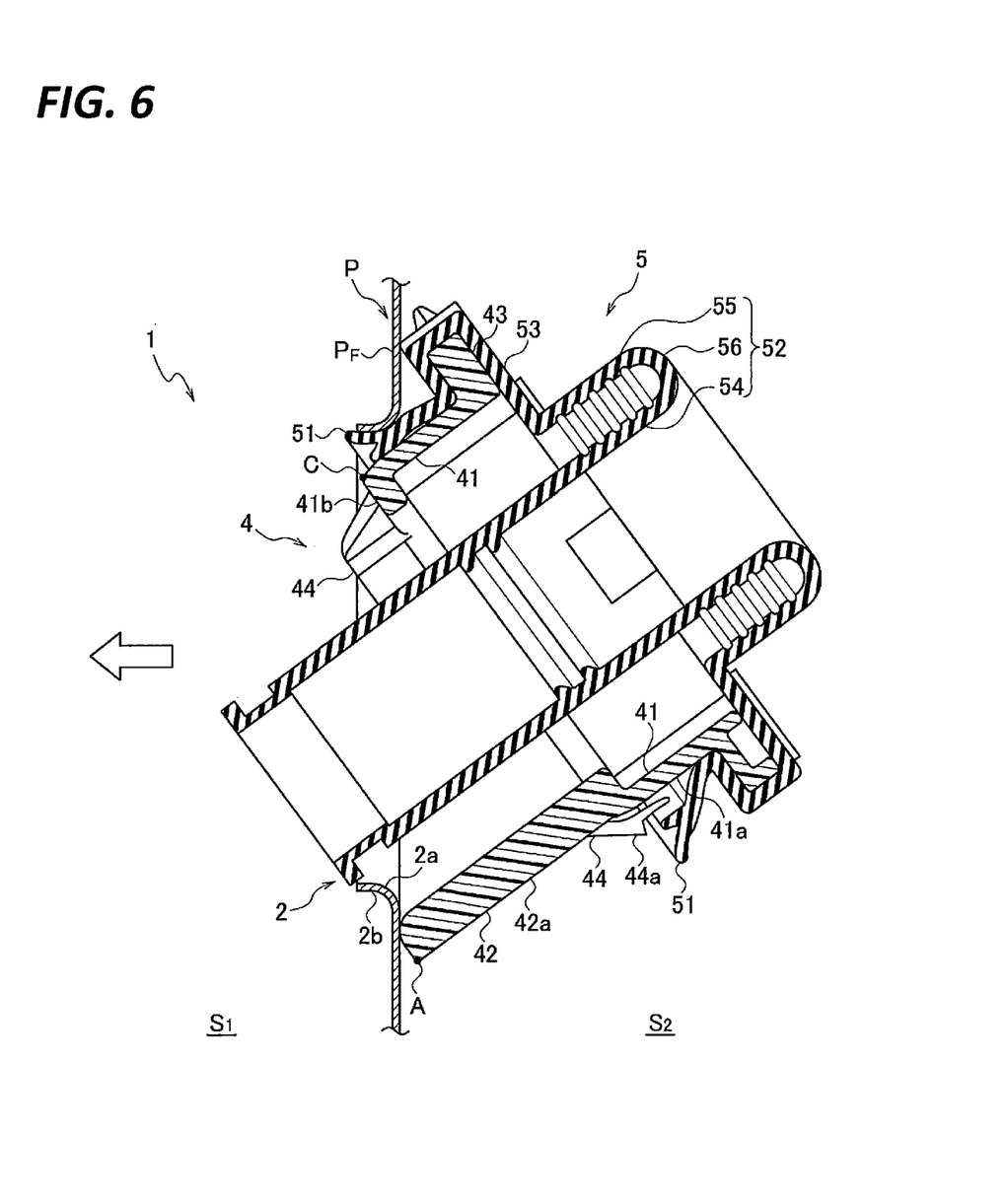
FIG. 6 is a cross-sectional view corresponding to FIG. 3 for illustrating a function of an extension portion when attaching the grommet to the through hole.

(1) In the grommet 1 in the present embodiment, the total of the linear distance L between the point A and the point B and the thickness T of the seal lip 51 is larger than the hole width W. For this reason, at the time of mounting the grommet 1 to the through hole 2, as shown in FIG. 6, when the seal lip 51 is sandwiched between the hole inner circumferential edge 2a and the outer circumferential surface 41a of the fitting portion 41, the leading end of the extension portion 42 is located on the outside of the through hole 2 in the insertion orthogonal direction. In other words, the extension portion 42 interferes with the circumferential edge portion of the through hole 2 to prevent the fitting portion 41 from being inserted and fitted to the through hole 2. In this manner, it is possible to prevent the case in which the grommet 1 is attached to the through hole 2 with the seal lip 51 sandwiched between the hole inner circumferential edge 2a and the outer circumferential surface 41a of the fitting portion 41, and the original sealability of the grommet 1 can be more reliably exhibited. Also, the task of confirming whether the seal lip 51 is sandwiched after attachment of the grommet 1 can be omitted, and workability is improved.

Figure 7:
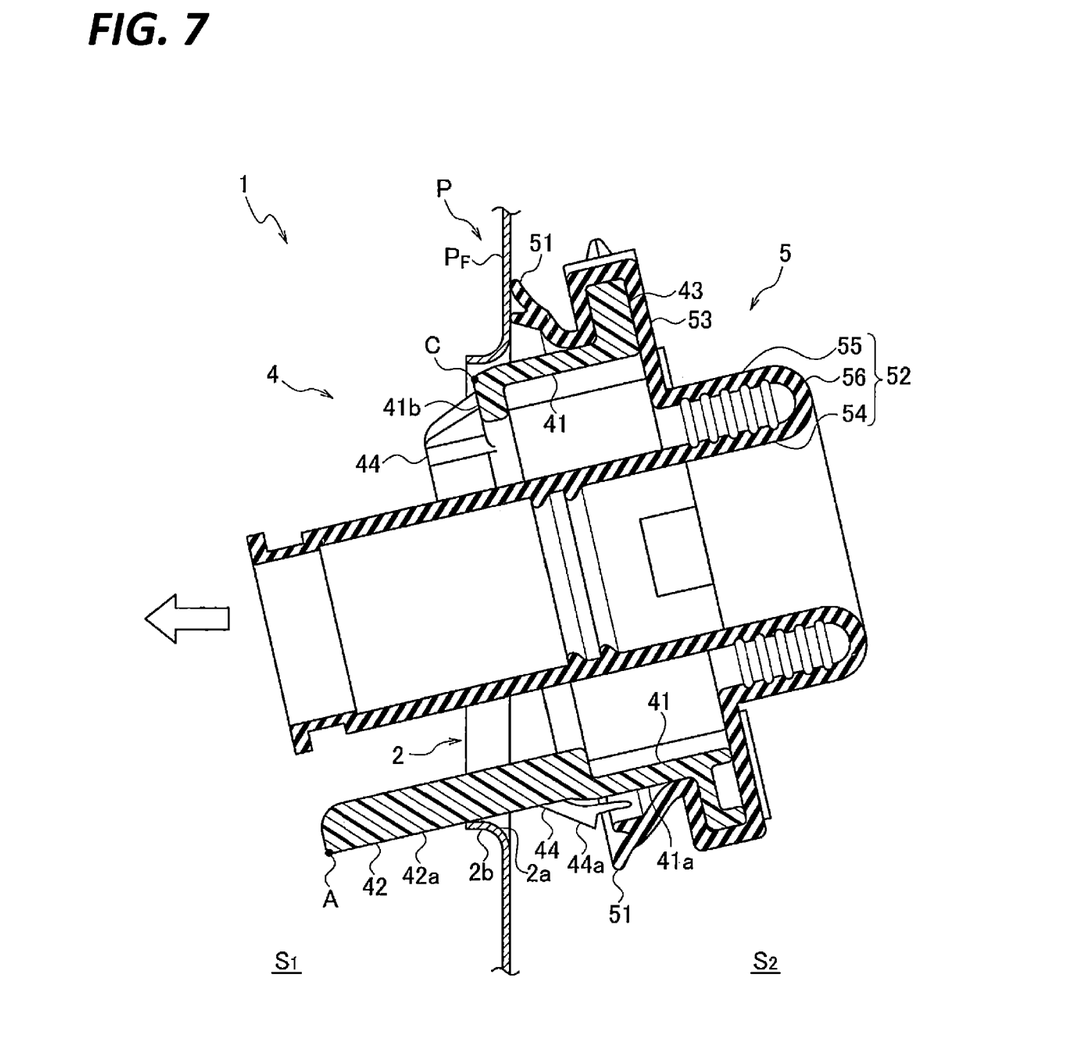
FIG. 7 is a cross-sectional view corresponding to FIG. 3 for illustrating the function of the extension portion when attaching the grommet to the through hole.

(2) Also, the extension portion 42 extends forward in the insertion direction from the fitting portion 41 that is fitted to the through hole 2. For this reason, as shown in FIG. 7, due to the extension portion 42 being inserted into the through hole 2 prior to the fitting portion 41, excessive rotation of the fitting portion 41 in a process from the start of the insertion of the extension portion 42 until the fitting of the fitting portion 41 to the through hole 2 can be prevented by the interference between the extension portion 42 and the hole inner circumferential edge 2a. In other words, by the extension portion 42 sliding on the hole inner circumferential edge 2a, the extension portion 42 can function as a guide member that guides the grommet 1 in the proper orientation while guiding the fitting portion 41 to the inside of the through hole 2. In this manner, in the case where the grommet 1 is blindly attached to the through hole 2 that is located in a position that is hard for the operator to see, for example, it is possible to attach the grommet 1 in the proper orientation more easily, and workability of the attachment of the grommet is improved.

(3) Further, for example, by the grommet 1 being pushed rearward in the insertion direction while unlocking the locking piece 44 from the burring 2b by pressing the side surface 44a of the locking piece 44 inward in the insertion orthogonal direction, the grommet 1 can be placed in a half-fitted state. In other words, in the grommet 1, as shown in FIGS. 3 and 7, the fitting portion 41 can be released from the through hole 2 while at least a portion of the inner tube portion 54 remains inside the through hole 2 (or in a state where at least a portion of the inner tube portion 54 is located across the opening surface of the through hole 2). Then, according to the present embodiment, the extension portion 42 extends on the lower side of the inner tube portion 54 so as to be interposed between the inner tube portion 54 and the hole inner circumferential edge 2a. For this reason, due to the extension portion 42, even in the half-fitted state, it is possible to prevent the interference (direct contact) of the inner tube portion 54 with the hole inner circumferential edge 2a due to dropping down of the protection tube 3, the wires, and the grommet 1 under their own weight. In this manner, damage to the inner tube portion 54 in the half-fitted state can be prevented. In particular, in the above embodiment, since the extension portion 42 extends to a position at the leading end of the inner tube portion 54 in the insertion direction, the above effect can be obtained more reliably.

(4) Also, as shown in FIG. 4, the extension portion 42 of the inner member 4 is located on the side on which the gravity G of the protection tubes 3 and the wires is located with respect to the center line X of the grommet 1. For this reason, when the grommet 1 is in the half-fitted state, the grommet 1, the protection tubes 3, and the wires can be stably supported by the hole inner circumferential edge 2a via the extension portion 42. Accordingly, when the grommet 1 is removed from the through hole 2, damage to the inner tube portion 54 due to interference between the grommet 1 and the hole inner circumferential edge 2a can be prevented more reliably. Note that, it is preferable that a deviation amount $\delta_1$ of the extension portion 42 from the center line X matches a deviation amount $\delta_2$ of the gravity G of the protection tubes 3 and the wires. In this case, the above effects can be obtained even more reliably. It is also preferable to provide a plurality of the extension portions 42 so as to be arranged adjacent to each other in the horizontal direction, in order to further increase the stability of support.

In the above embodiment, the total of the linear distance L between the point A and the point B and the thickness T of the seal lip 51 is larger than the hole width W (L+T>W), but the linear distance L may be set to be larger than the hole width W (L>W). In this case, even if the case where the thickness of the seal lip 51 interposed between the hole inner circumferential edge 2a and the outer circumference of the fitting portion 41 is very small, the extension portion 42 interferes with the circumferential edge portion of the through hole 2. Accordingly, the case in which the grommet 1 is attached to the through hole 2 while the seal lip 51 is sandwiched between the grommet 1 and the through hole 2 can be prevented more reliably.

The above embodiment is merely example described for facilitating understanding of the invention. The technical scope of the invention is not limited to the specific technical matters disclosed in the above embodiment, and various variations, modifications, alternatives, and the like that can be easily derived therefrom are also encompassed therein.

For example, in the above embodiment, an example in which the grommet 1 is attached to the lateral through hole 2 has been described, however, needless to say, the grommet 1 can be attached to a through hole that is open upward, downward, or in the oblique direction.

When the grommet 1 of the present embodiment is inserted into the through hole 2 in the proper orientation, the axial direction of the engaged portion 41 matches the insertion direction.

The combination of the panel member P of the embodiment and the grommet 1 may be referred as a panel assembly. A surface rearward of the panel member P in the insertion direction may be referred as a panel surface. As shown in FIG. 3, the seal lip 51 may be in surface contact with the panel surface for waterstopping purposes.

As shown in FIG. 3, the extension portion 42 may include a surface that curves like an arc (also referred to as a curved surface) on an inward part of the leading end of the extension portion 42 in the insertion orthogonal direction. This curved surface may be an edgeless surface that extends between the leading end of the extension portion 42 and a surface of the extension portion 42 that faces radially inward, such that these faces are smoothly connected. The side surface 42a of the extension portion 42 is an example of a guide surface for guiding insertion of the grommet 1 into the through hole 2 by sliding on the hole inner circumferential edge 2a of the through hole 2.

As shown in FIGS. 1 to 3, the inner member 4 may include the inner space, and the inner member 4 may be referred as a tubular inner frame. The center axis line of the tubular inner frame may match the axis 2c of the through hole 2. The grommet main body 5 may be supported by the tubular inner frame from radially inside thereof. A resin material that forms the tubular inner flame may be referred as a first material, and an elastic resin material such as rubber or elastomer that forms the grommet main body 5 may be referred to as a second material. The second material may have a higher flexibility than the first material. In other words, the first material may be a synthetic resin having a higher rigidity and/or hardness than the second material.

The fitting portion 41 of the embodiment may be referred as a tube portion, and the outer circumferential surface 41a of the fitting portion 41 may be referred as a radially outward surface. As shown in FIGS. 1 to 3, the tube portion may include a radially inward surface that partitions the inner space, and an axial front edge that is continuous with the radially outward surface.

The plurality of locking pieces 44 may also be referred as one or more latch protrusions. The extension portion 42 may be referred as a single axial protrusion that axially protrudes from the axial front edge of the fitting portion 41. One or more latch protrusions may protrude radially outward relative to the radially outward surface of the tube portion. For example, in FIG. 2, the circumferential position in which a single axial protrusion of the axial front edge of the fitting portion 41 may be referred as a first circumferential position. The one or more latch protrusions include a first latch protrusion provided in a second circumferential position that is different from the first circumferential position and a second latch protrusion provided at a third circumferential position that is different from the first circumferential position and the second circumferential position. The first latch protrusion may also be, in FIG. 3 for example, a latch protrusion near the point B, that is, a latch protrusion that is farthest from the single axial protrusion. The second latch protrusion may also be, in FIG. 3 for example, a latch protrusion that is adjacent to or nearest the single axial protrusion.

The hole inner circumferential edge 2a of the through hole 2 to which the one or more latch protrusions are fitted may be referred as an opening edge of the through hole 2. A position of the opening edge of the through hole 2 corresponding to the first circumferential position may be referred as a first opening edge portion, and a position of the opening edge of the through hole 2 corresponding to the second circumferential position may be referred as a second opening edge portion.

The protruding length of the single axial protrusion from the axial front end along the center axis line matches the distance $D_{C2}$ (see FIG. 3) between the point A and the point C along the insertion direction. The protruding length of the single axial protrusion may be set such that the distance between the first latch protrusion and the leading end of the single axial protrusion on the guide surface is longer than the length along the center axis line of the tube portion and greater than a predetermined value. The protrusion length of the single axial protrusion may be set such that the first distance between the leading end of the single axial direction on the guide surface and the second latch protrusion is larger than the predetermined value and the second distance between the second latch protrusion and the leading end of the single axial protrusion on the guide surface is the predetermined value or less. As shown in FIG. 3, the leading end of the single axial protrusion on the guide surface may be the point A, for example. That is, the leading end of the single axial protrusion on the guide surface may be the leading edge of the tubular inner frame.

The predetermined value may also be the linear distance between the first opening edge position and the second opening edge position. This linear distance may be substantially equal to the hole width W in FIG. 5, for example.

The present disclosure encompasses the implementation examples described below. Reference signs have been given to some of the constituent elements of the exemplary embodiments, not for limitation, but as an aid to understanding. Some of the items described in the implementation examples below may be omitted, and some of the items described in the implementation examples may be selected or exacted and combined.

Supplementary Note 1

A grommet (1) according to some aspects of the present disclosure may include:
- a tube portion (41);
- a latch protrusion (44) that extends axially forward of the tube portion (41) from an axial front end of the tube portion (41);
- a single axial protrusion (42) that extends axially forward of the latch protrusion (44) from the axial front end of the tube portion (41); and
- a seal lip (51) provided in a surroundings of the tube portion (41).

Supplementary Note 2

In some aspects of the present disclosure, the grommet (1) may include a tubular insertion portion (54) for insertion of an elongated member (3), and
the single axial protrusion (42) may extend to an axial position that is substantially the same as an axial leading end of the insertion portion (54) substantially in parallel with the insertion portion (54).

Supplementary Note 3

A panel assembly according to some aspects of the present disclosure includes a panel member (P) that has a through hole (2), and a grommet (1) that is to be mounted to the through hole (2), and
the grommet (1) includes:
- a tube portion (41) that is inserted and fitted to the through hole (2) in an insertion direction;
- a single axial protrusion (42) that extends forward in the insertion direction from an axial front end of the tube portion (41); and
- a seal lip (51) that is provided on a circumference of the tube portion (41) and abuts a circumferential edge portion of the through hole (2) of the panel member (P);
when it is assumed that a point at a leading end position in the insertion direction of the single axial protrusion (42) is a point A,
a point at a position farthest from the point A as seen in the insertion direction in a leading end region (41b) in the insertion direction of the tube portion (41) is a point B, and
a width of the through hole (2) on a cross section that is parallel with the insertion direction and passes through the point A and the point B when the tube portion (41) is fitted to the through hole (2) is a hole width W,
a total of a linear distance L between the point A and the point B and a thickness T of the seal lip (51) is larger than the hole width W.

Supplementary Note 4

A panel assembly according to some aspects of the present disclosure includes a panel member (P) that has a through hole (2), and a grommet (1) that is to be attached to the through hole (2), and
the grommet (1) includes:
- a tube portion (41) that is inserted and fitted to the through hole (2) in an insertion direction;
- a single axial protrusion (42) that extends forward from an axial front end of the tube portion (41) in the insertion direction; and
- a seal lip (51) that is provided in a surroundings of the tube portion (41) and abuts a circumferential edge portion of the through hole (2) of the panel member (P),
when it is assumed that a point at a leading end position in the insertion direction of the single axial protrusion (42) is a point A,
a point at a position farthest from the point A as seen in the insertion direction in a leading end region (41b) in the insertion direction of the tube portion (41) is a point B, and
a width of the through hole (2) in a cross section that is parallel with the insertion direction and passes through the point A and the point B when the tube portion (41) is fitted to the through hole (2) is a hole width W,
a total of a linear distance L between the point A and the point B is larger than the hole width W.

Supplementary Note 5

In some aspects of the present disclosure, the grommet (1) may include a tubular insertion portion (54) for insertion of an elongated member (3); and
the single axial protrusion (42) may extend such that the single axial protrusion (42) is interposed between the insertion portion (54) and the inner circumferential edge of the through hole (2) downward of the insertion portion (54) in the gravity direction when at least a portion of the insertion portion (54) is located inside of the through hole (2).

Supplementary Note 6

In some aspects of the present disclosure, the grommet (1) may include an inner member (4) and a grommet main body (5), and
the grommet main body (5) may include a double cylindrical portion (52) disposed on an inner circumferential side of the seal lip (51) and a connection portion (53) for connection between the seal lip (51) and the double cylindrical portion (52).

Supplementary Note 7

In some aspects of the present disclosure, the insertion portion (54) may protrude forward in the insertion direction from a latch protrusion (44).

Supplementary Note 8

In some aspects of the present disclosure, the single axial protrusion (42) may include a curved surface that curves in an arc shape, on an inward part of a leading end of the single axial protrusion (42) in an insertion orthogonal direction.

Supplementary Note 9

Some aspects of the present disclosure may be directed to a grommet (1) configured to be removably attached to a panel member (P) that includes a through hole (2) and a panel surface, and the grommet (1) may include:
- a tubular inner frame (4) that is formed by a first material and includes an inner space; and a grommet main body (5) that is formed by a second material that has a higher flexibility than the first material, and is supported by the tubular inner frame (4) from radially inward, and that has a seal lip (51) configured to be in surface contact with the panel surface for waterstopping purposes, the tubular inner frame (4) may include:

a tube portion (41) that has a radial inward surface that defines the inner space, a radially outward surface (41*a*), and an axial front end that is continuous with the radial outward surface (41*a*);

one or more latch protrusions (44) that protrude radially outward from the radially outward surface (41*a*) of the tube portion (41), the latch protrusions (44) being configured to be engaged with an opening edge of the through hole (2) of the panel member (P) and position the grommet (1) to the panel member (P); and a single axial protrusion (42) provided at a first circumferential position at the axial front end of the tube portion (41) and protrudes from the axial front end of the tube portion (41) along a center axis line of the tube portion by a protrusion length ($D_{C2}$).

Supplementary Note 10

In some aspects of the present disclosure, the single axial protrusion (42) may include a guide surface (42*a*) that slides on the opening edge of the through hole (2) when the grommet (1) is attached to the panel member (P), and thereby the tube portion (41) is guided into the through hole (2).

Supplementary Note 11

In some aspects of the present disclosure, the protrusion length ($D_{C2}$) of the single axial protrusion may be set such that the distance between a leading end of the single axial protrusion (42) and the one or more latch protrusions (42) on the guide surface (42*a*) is longer than the length of the tube portion (41) along the center axial line and greater than a predetermined value (W), for example.

Supplementary Note 12

In some aspects of the present disclosure, one of more latch protrusions (44) may include:

a first latch protrusion provided on the radially outward surface (41*a*) of the tube portion (41) at a second circumferential position that is different from the first circumferential position;

and a second latch protrusion provided on the radially outward surface (41*a*) of the tube portion (41) at a third circumferential position that is different from the first circumferential position and the second circumferential position, and in the protruding length ($D_{C2}$) of the single axial protrusion (42), a first distance between the leading end of the single axial protrusion (42) and the first latch protrusion may be set to exceed the predetermined value (W), and a second distance between the leading end of the single axial protrusion (42) and the second latch protrusion may be set to be the predetermined value (W) or less.

Supplementary Note 13

In some aspects of the present disclosure, the opening edge of the though hole (2) may include a first opening edge position and a second opening edge position that respectively correspond to the first circumferential direction position and the second circumferential position, and the predetermined value (W) may be a linear distance between the first opening edge position and the second opening edge position of the through hole (2).

Supplementary Note 14

In some aspects of the present disclosure, the leading end of the single axial protrusion (42) may be a leading end of the tubular inner frame (4).

Supplementary Note 15

In some aspects of the present disclosure, the first material may be a synthetic resin that have a higher rigidity and/or hardness than the second material.

Supplementary Note 16

In some aspects of the present disclosure, the second material may be rubber or elastomer.

LIST OF REFERENCE NUMERALS

1 Grommet
2 Through hole
2*a* Inner circumferential edge
3 Protection tube (elongated member)
41 Fitted portion
41*b* Leading end region
42 Extension portion
51 Seal lip
54 Inner tube portion (insertion portion)
G Gravity
X Center line

What is claimed is:

1. A grommet comprising:

a fitting portion to be inserted and fitted to a through hole in an insertion direction;

a single extension portion extending forward in the insertion direction from the fitting portion; and a seal lip provided on a circumference of the fitting portion, and to seal an outer circumference of the fitting portion that is fitted to the through hole by abutting a circumferential edge portion of the through hole, and when it is assumed that a point at a tip position of the single extension portion in the insertion direction is a point A, a point at a position furthest from the point A as seen in the insertion direction in the leading end region of the fitting portion in the insertion direction is a point B, and a width of the through hole in a cross section that is parallel with the insertion direction and passes through the point A and the point B when the fitting portion is fitted to the through hole is a hole width W, a total of a linear distance L between the point A and the point B and a thickness T of the seal lip is larger than the hole width W, and the single extension portion includes a curved surface having an arc-like curved cross section along the insertion direction, on an inward part of the tip position of the single extension portion in the insertion orthogonal direction.

2. The grommet according to claim 1, further comprising:

a tubular insertion portion for insertion of an elongated member, wherein the single extension portion extends such that the single extension portion is interposed between the insertion portion and an inner circumferential edge of the through hole, downward of the insertion portion when at least a portion of the insertion portion is located inside the through hole.

3. The grommet according to claim 2, wherein a center of gravity of the elongated member inserted into the insertion portion is eccentrically located relative to a center line of the grommet in a horizontal direction that is orthogonal to the insertion direction, and the single extension portion is located on a side on which the center of gravity of the elongated member is present relative to the center line.

4. The grommet according to claim 1, wherein the single extension portion has a flat side surface that extends in parallel with the insertion direction, on an outward part in the insertion orthogonal direction, and the side surface is smoothly continuous with an outer circumferential surface of the fitting portion.

5. The grommet according to claim 1, wherein the through hole has an oblong-like shape elongated in a horizontal direction orthogonal to the insertion direction, and the fitting portion has an oblong-like shape as viewed in the insertion direction.

6. A panel assembly comprising:

a panel member including a through hole; and the grommet of claim 1, wherein the grommet is configured to be mounted to the through hole.

7. The panel assembly according to claim 6, wherein the panel member is a vehicle body panel configured to partition between a first space inside a vehicle cabin and a second space outside the vehicle cabin.

* * * * *